(12) United States Patent
Maeda

(10) Patent No.: US 12,487,444 B2
(45) Date of Patent: Dec. 2, 2025

(54) OPTICAL UNIT, MANUFACTURING METHOD FOR OPTICAL UNIT, AND ENDOSCOPE

(71) Applicant: OLYMPUS CORPORATION, Tokyo (JP)

(72) Inventor: Kazuya Maeda, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 718 days.

(21) Appl. No.: 17/899,727

(22) Filed: Aug. 31, 2022

(65) Prior Publication Data

US 2022/0404606 A1   Dec. 22, 2022

Related U.S. Application Data

(63) Continuation of application No. PCT/JP2020/009759, filed on Mar. 6, 2020.

(51) Int. Cl.
| | |
|---|---|
| *G02B 23/24* | (2006.01) |
| *A61B 1/00* | (2006.01) |
| *B29D 11/00* | (2006.01) |
| *G02B 5/00* | (2006.01) |
| *A61B 1/05* | (2006.01) |
| *B29K 69/00* | (2006.01) |
| *B29K 709/08* | (2006.01) |

(52) U.S. Cl.
CPC ........ *G02B 23/2423* (2013.01); *A61B 1/0011* (2013.01); *B29D 11/0074* (2013.01); *G02B 5/003* (2013.01); *A61B 1/051* (2013.01); *B29K 2069/00* (2013.01); *B29K 2709/08* (2013.01); *G02B 23/2484* (2013.01)

(58) Field of Classification Search
CPC ......................... G02B 23/2423; G02B 5/003; G02B 23/2484; G02B 7/021; G02B 13/0085; G02B 23/24; G02B 5/00; G02B 7/02; A61B 1/0011; A61B 1/051; A61B 1/00; B29D 11/0074; B29D 11/00307; B29D 11/00; B29K 2069/00; B29K 2709/08
See application file for complete search history.

(56) References Cited

U.S. PATENT DOCUMENTS

| | | | | |
|---|---|---|---|---|
| 2011/0096213 | A1* | 4/2011 | Hasegawa | H04N 23/57 264/1.36 |
| 2011/0211102 | A1* | 9/2011 | Yamada | G02B 5/005 348/294 |

(Continued)

FOREIGN PATENT DOCUMENTS

| | | |
|---|---|---|
| EP | 3 369 363 A1 | 9/2018 |
| JP | 2012/199868 A | 10/2012 |

(Continued)

OTHER PUBLICATIONS

International Search Report dated Jun. 2, 2020 received in PCT/JP2020/009759.

*Primary Examiner* — Balram T Parbadia
(74) *Attorney, Agent, or Firm* — Scully, Scott, Murphy & Presser, P.C.

(57) ABSTRACT

An optical unit includes a transparent first substrate, a transparent second substrate, a transparent first projection forming a part of an optical path, and a first aperture configured by black resin filled in a periphery of the first projection between the first substrate and the second substrate.

11 Claims, 13 Drawing Sheets

(56) References Cited

U.S. PATENT DOCUMENTS

| | | | |
|---|---|---|---|
| 2011/0211105 A1* | 9/2011 | Yamada | G02B 3/0056 348/340 |
| 2012/0242884 A1 | 9/2012 | Ishiguro et al. | |
| 2013/0003199 A1* | 1/2013 | Jeong | B29D 11/00375 264/1.7 |
| 2015/0206914 A1* | 7/2015 | Rudmann | H10F 71/00 438/459 |
| 2015/0378133 A1* | 12/2015 | Kuwana | G02B 3/0075 348/374 |
| 2017/0371077 A1* | 12/2017 | Okamoto | G02B 7/008 |
| 2018/0109707 A1* | 4/2018 | Yoneyama | H01L 24/00 |
| 2018/0256274 A1* | 9/2018 | Baba | G02B 1/118 |
| 2018/0303325 A1 | 10/2018 | Fujimori | |
| 2019/0079280 A1 | 3/2019 | Yoshida et al. | |
| 2019/0090720 A1 | 3/2019 | Maeda | |
| 2019/0243086 A1* | 8/2019 | Rodda | G02B 7/021 |
| 2021/0134868 A1* | 5/2021 | Tsujio | G02B 3/00 |

FOREIGN PATENT DOCUMENTS

| | | |
|---|---|---|
| JP | 2014/006329 A | 1/2014 |
| WO | 2017/073440 A1 | 5/2017 |
| WO | 2017/203593 A1 | 11/2017 |
| WO | 2017/212520 A1 | 12/2017 |
| WO | 2020/084728 A1 | 4/2020 |

\* cited by examiner

OPTICAL UNIT, MANUFACTURING METHOD FOR OPTICAL UNIT, AND ENDOSCOPE

CROSS REFERENCE TO RELATED APPLICATION

This application is a continuation application of PCT/JP2020/009759 filed on Mar. 6, 2020, the entire contents of which are incorporated herein by this reference.

BACKGROUND OF THE INVENTION

1. Field of the Invention

The present invention relates to an optical unit in which a plurality of optical substrates are stacked, a manufacturing method for the optical unit in which the plurality of optical substrates are stacked, and an endoscope including the optical unit in which the plurality of optical substrates are stacked.

2. Description of Related Art

For example, a reduction in the size of an optical unit disposed at a distal end portion of an endoscope is important for low invasiveness.

International Publication No. 2017-212520 discloses a so-called wafer level optical unit manufactured by cutting a bonded wafer obtained by stacking a plurality of optical wafers each including a plurality of optical substrates.

An aperture for limiting a light beam is indispensable for the optical unit.

SUMMARY OF THE INVENTION

An optical unit in an embodiment includes: a transparent first substrate including a first principal surface and a second principal surface on an opposite side of the first principal surface; a transparent second substrate including a third principal surface and a fourth principal surface on an opposite side of the third principal surface; a transparent first projection that defines an interval between the first principal surface and the fourth principal surface and forms a part of an optical path; and a first aperture configured by black resin filled in a space between the first principal surface and the fourth principal surface around the first projection.

An endoscope in another embodiment includes: an optical unit; and an image sensor configured to receive an object image condensed by the optical unit. The optical unit includes a transparent first substrate including a first principal surface and a second principal surface on an opposite side of the first principal surface, a transparent second substrate including a third principal surface and a fourth principal surface on an opposite side of the third principal surface, a transparent first projection that defines an interval between the first principal surface and the fourth principal surface and forms a part of an optical path, and a first aperture configured by black resin filled in a space between the first principal surface and the fourth principal surface around the first projection.

A manufacturing method for an optical unit in another embodiment includes: manufacturing a transparent first wafer including a first principal surface and a second principal surface on an opposite side of the first principal surface and including a plurality of first projections on the first principal surface; bonding a fourth principal surface of a transparent second wafer including a third principal surface and the fourth principal surface on an opposite side of the third principal surface and the plurality of first projections of the first wafer; dividing a bonded wafer including the first wafer and the second wafer into a plurality of units each including the first projection; and filling black resin in a space between the first principal surface and the fourth principal surface around the first projections of the units.

DETAILED DESCRIPTION OF PREFERRED EMBODIMENTS

<Endoscope>

Figure 1:
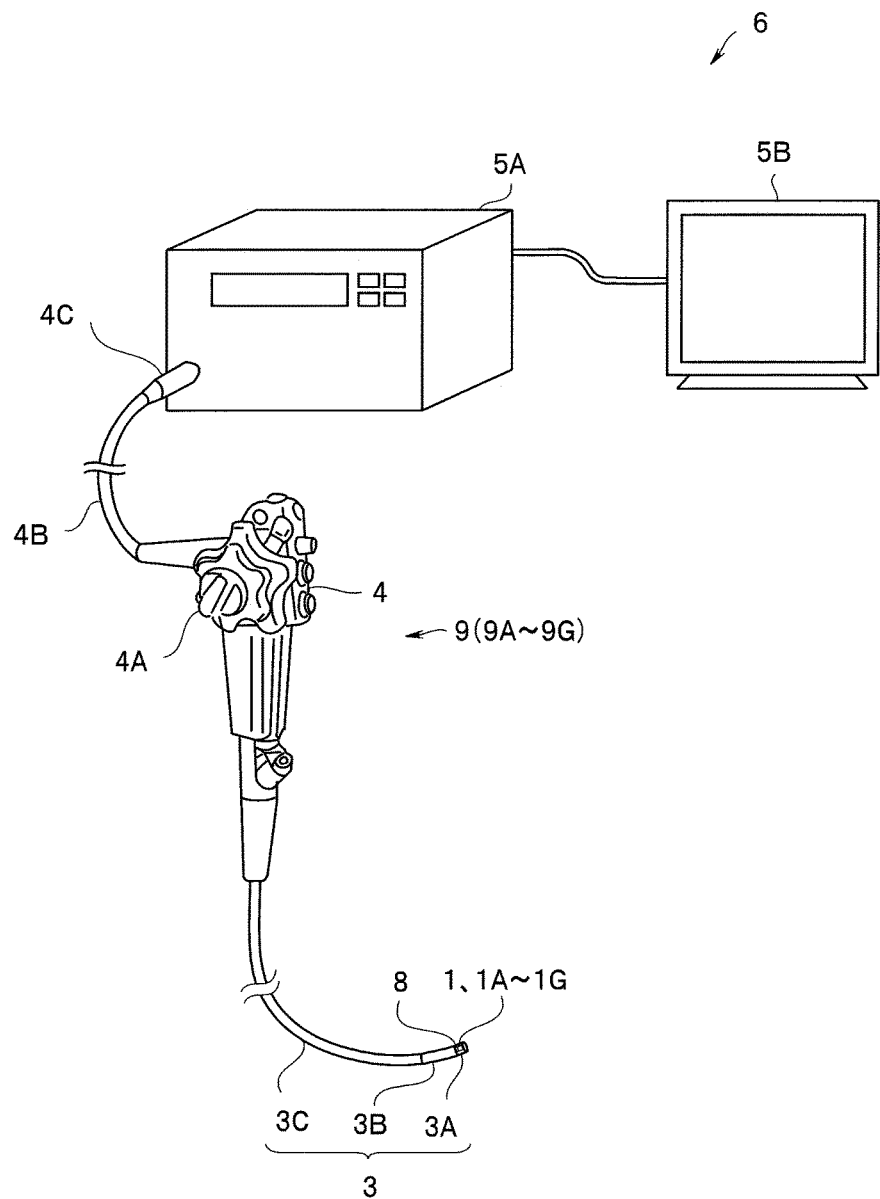
FIG. 1 is a configuration diagram of an endoscope system including an endoscope in an embodiment.

An endoscope 9 in an embodiment shown in FIG. 1 configures an endoscope system 6 in conjunction with a processor 5A and a monitor 5B.

The endoscope 9 includes an insertion section 3, a grasping section 4, a universal cord 4B, and a connector 4C. The grasping section 4 is disposed at a proximal end portion of the insertion section 3. The universal cord 4B is extended from the grasping section 4. The connector 4C is disposed at a proximal end portion of the universal cord 4B. The insertion section 3 includes a distal end portion 3A, a bending portion 3B, and a flexible portion 3C extended from the bending portion 3B. The bending portion 3B for changing a direction of the distal end portion 3A is extended from the distal end portion 3A and is bendable. A turning angle knob 4A, which is an operation section for a surgeon to operate the bending portion 3B, is disposed in the grasping section 4.

The universal cord 4B is connected to the processor 5A by the connector 4C. The processor 5A controls the entire endoscope system 6, performs signal processing on an image pickup signal, and outputs the image pickup signal as an image signal. The monitor 5B displays, as an endoscopic image, the image signal outputted by the processor 5A. Note that the endoscope 9 is a flexible endoscope but may be a rigid endoscope. The endoscope 9 may be either for a medical use or an industrial use.

An optical unit 1 is disposed at the distal end portion 3A together with an image sensor 8 that receives an object image condensed by the optical unit 1 and outputs an image pickup signal.

As explained below, the optical unit 1 is easy to manufacture and is high in reliability. Accordingly, the endoscope 9 is easy to manufacture and is high in reliability.

<Optical Unit>

Figure 2:
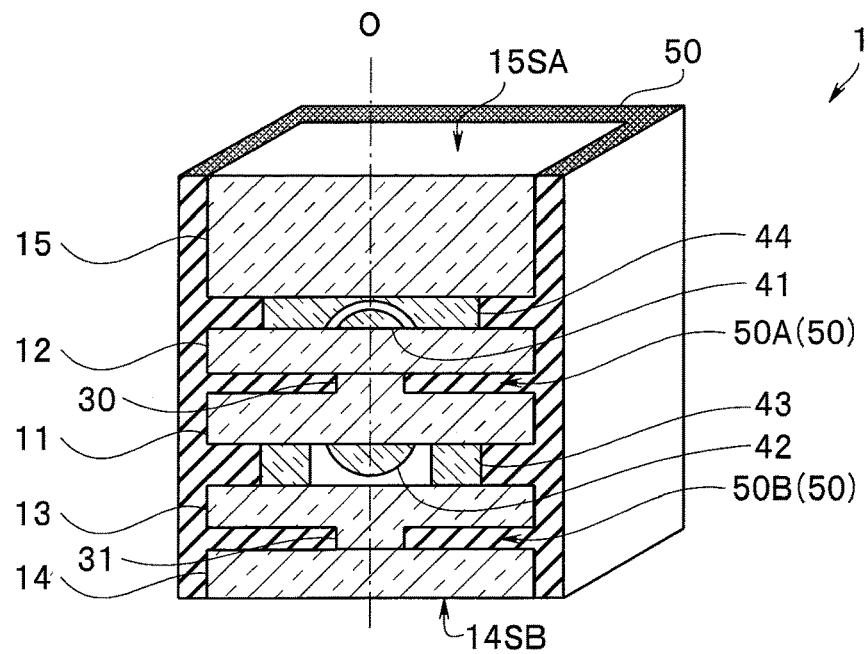
FIG. 2 is a perspective sectional view of an optical unit in the embodiment.
Figure 3:
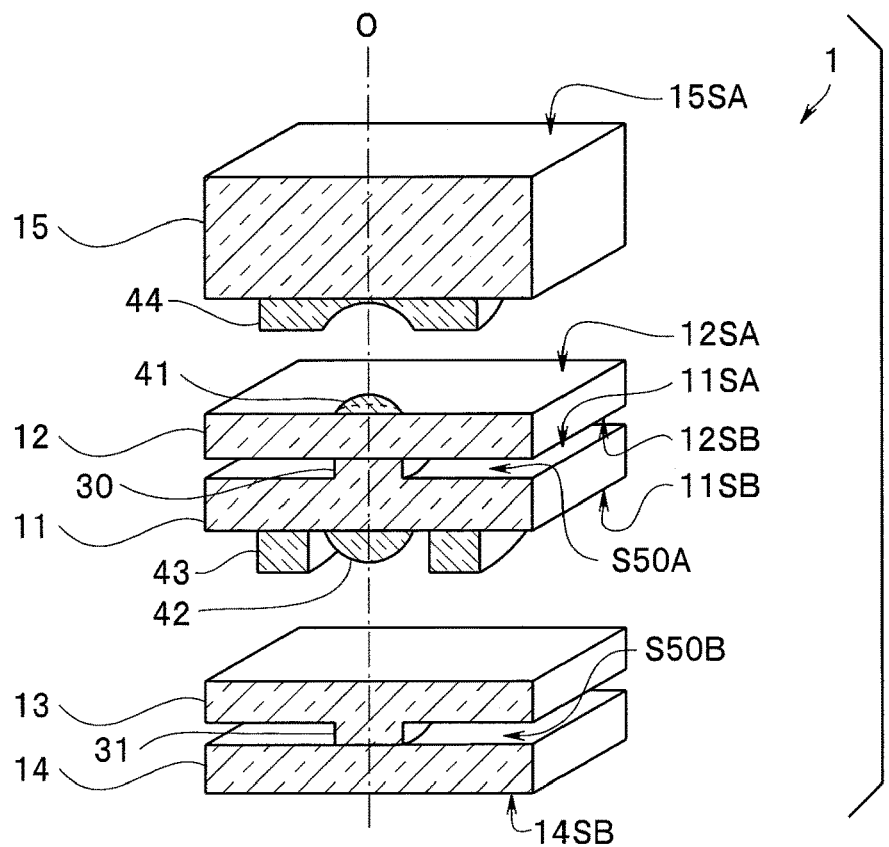
FIG. 3 is an exploded sectional view of the optical unit in the embodiment.

The optical unit 1 shown in FIG. 2 and FIG. 3 is a stacked body in which a plurality of optical substrates 11 to 15 are stacked.

Note that, in the following explanation, drawings based on respective embodiments are schematic. Relations between thicknesses and widths of respective portions, ratios of the thicknesses and relative angles of the respective portions, and the like are different from real ones. Portions different in relations and ratios of dimensions of the portions are sometimes included among the drawings. For example, a first projection 30 (see FIG. 2 and the like) is illustrated larger than other members. Illustration of a part of components is sometimes omitted.

As explained below, the optical unit 1 is a wafer level optical unit manufactured by cutting a bonded wafer 1W (see FIG. 9). Accordingly, as shown in FIG. 2 and FIG. 3, the optical unit 1 is a substantially rectangular parallelepiped. All of a first substrate 11 to a fifth substrate 15 are optical substrates, sectional shapes in an optical axis orthogonal direction of which are rectangles, external dimensions of which are the same sizes. The first substrate 11 to the fifth substrate 15 are stacked such that optical axes O of the respective substrates coincide. Note that black resin 50 (see FIG. 2) is not shown in FIG. 3.

The first substrate 11 is a transparent glass substrate including a first principal surface 11SA and a second principal surface 11SB on an opposite side of the first principal surface 11SA. A convex lens 42 made of transparent resin and a spacer 43 surrounding the convex lens 42 without a gap are disposed on the second principal surface 11SB.

Note that "transparent" means that absorption of passing light having a predetermined wavelength is small and transparency is high and does not mean being transparent in terms of a human visual sense. More specifically, "transparent" means, for example, having transmittance of 80% or more with respect to light having a predetermined wavelength specified by spectral sensitivity of a solid-state image pickup device.

The second substrate 12 is a transparent glass substrate including a third principal surface 12SA and a fourth principal surface 12SB on an opposite side of the third principal surface 12SA. A convex lens 41 made of transparent resin is disposed on the third principal surface 12SA.

A first projection 30 is present on the first principal surface 11SA of the first substrate 11 (hereinafter simply referred to as "first projection 30"). As explained below, in the optical unit 1, the first projection 30 forming a part of an optical path is formed by etching the first substrate 11. In other words, in the optical unit 1, the first projection 30, an upper surface of which is a plane, is a part of the first substrate 11. The first projection 30 and the first substrate 11 are inseparable. However, the first projection 30 may be a member separate from the first substrate 11 if the first projection 30 is sandwiched by the first principal surface 11SA and the fourth principal surface 12SB.

The first projection 30 is sandwiched by the first principal surface 11SA and the fourth principal surface 12SB and has a spacer function for defining an interval between the first principal surface 11SA and the fourth principal surface 12SB. A sectional shape of the first projection 30 in a direction orthogonal to an optical axis is a circle centering on an optical axis O. External dimensions of the first projection 30 are smaller than external dimensions of the first substrate 11. An aperture space S50A is present around the transparent first projection 30 between the first principal surface 11SA and the fourth principal surface 12SB. A first aperture 50A is configured by the black resin 50 filled in the aperture space S50A. In other words, in the aperture 50A, a region equivalent to an opening of an aperture is not a space, which is an intangible, but is the first projection 30.

Note that the optical unit 1 includes a second aperture 50B having the same configuration as the configuration of the first aperture 50A. In other words, the third substrate 13, on which a transparent second projection 31 is present, and the fourth substrate 14 are bonded. The second aperture 50B is configured by the black resin 50 in an aperture space S50B around the second projection 31 as well.

The first aperture 50A and the second aperture 50B configured by the black resin 50 have a higher light blocking property than an aperture configured by a light blocking film and are easy to manufacture.

The first aperture 50A disposed in a position closer to an object than the second aperture 50B is a brightness aperture. The second aperture 50B is a flare aperture. Each of the first aperture 50A and the second aperture 50B is hereinafter referred to as an aperture 50.

The fifth substrate 15 including a concave lens 44 is bonded to the third principal surface 12SA of the second substrate 12.

Note that side surfaces of the first substrate 11 to the fifth substrate 15 are entirely covered with the black resin 50. Since a side surface of the optical unit 1 is covered with the black resin 50, the optical unit 1 is less easily affected by external light.

The optical unit 1 condenses light made incident from an upper surface 15SA of the fifth substrate 15 and emits the light from a lower surface 14SB of the fourth substrate 14. The light condensed by the optical unit 1 is converted into an electric signal by an image pickup unit (not shown).

In a wafer level optical unit, machining using light is difficult if a shielding film functioning as an aperture is disposed in an optical wafer. For example, it is difficult to bond wafers with ultraviolet curing resin or it is likely that bonding strength of the wafers decreases.

A process for manufacturing an aperture using the shielding film includes film formation by a sputtering method or the like, etching mask disposition by a photolithography method, and patterning by ion milling or the like. Therefore, the aperture cannot be disposed after the wafers are stacked.

In the optical unit 1, the first aperture 50A and the second aperture 50B are configured by the black resin 50 filled around the first projection 30 and the second projection 31. The black resin 50, which is a light blocking material, is not disposed when the machining using light (for example, curing of bonding resin by ultraviolet ray irradiation) is performed. Therefore, the optical unit 1 is easy to manufacture and is high in reliability. Since a light blocking property of an aperture made of the black resin 50 is high, the optical unit 1 is high in performance.

The optical unit of the present invention only has to include at least one aperture 50 made of black resin filled in an aperture space around one transparent projection.

A configuration of the optical unit 1, that is, a shape, the number, disposition, an external shape, and the like of optical substrates are designed according to specifications. For example, any one of the substrates may be an infrared ray cut filter. It is evident that the first projection 30 may be a projection of the fourth principal surface 12SB of the second substrate 12. Light emitted by the optical unit 1 may be further received by the image sensor 8 through another optical unit. Light emitted by the other optical unit may be made incident on the optical unit 1.

<Manufacturing Method>

Figure 4:
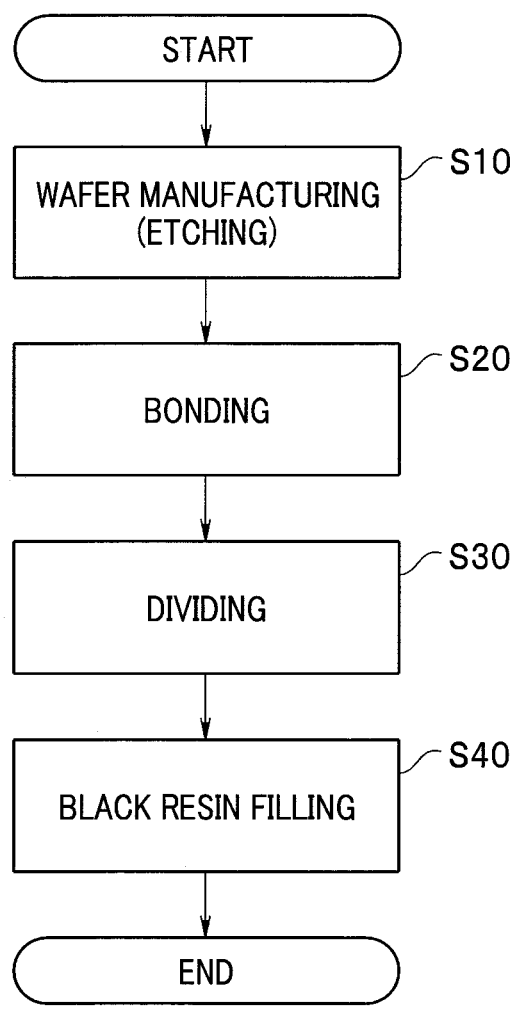
FIG. 4 is a flowchart of a manufacturing method for the optical unit in the embodiment.

A manufacturing method for the optical unit 1 is explained with reference to a flowchart of FIG. 4.

<Step S10> Wafer Manufacturing Step

Figure 5:
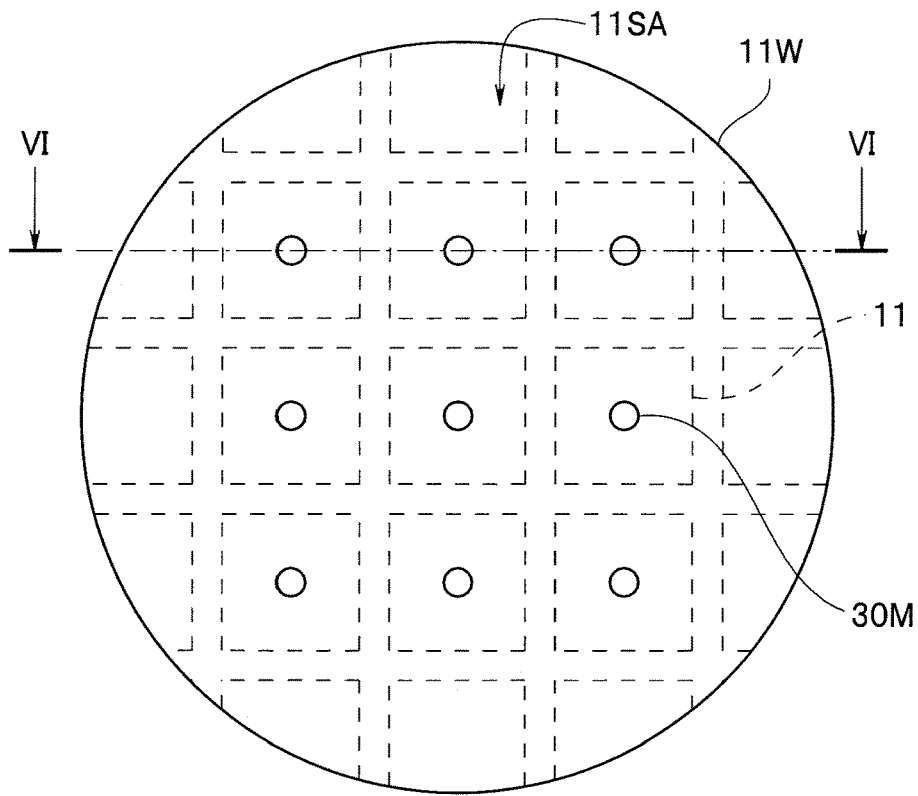
FIG. 5 is a plan view of a glass wafer for explaining the manufacturing method for the optical unit in the embodiment.
Figure 6:
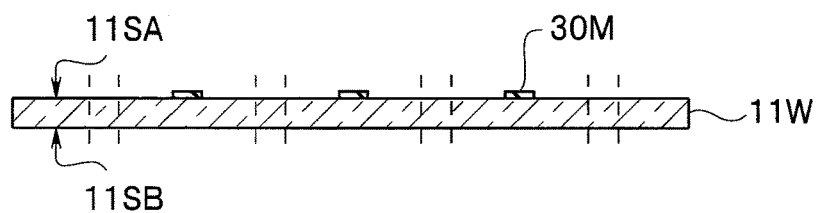
FIG. 6 is a sectional view taken along a VI-VI line in FIG. 4.

As shown in FIG. 5 and FIG. 6, a first wafer 11W made of glass includes the first principal surface 11SA and the second principal surface 11SB on the opposite side of the first principal surface 11SA. An etching mask 30M made of, for example, a photoresist is disposed on the first principal surface 11SA of the first wafer 11W.

Figure 7:
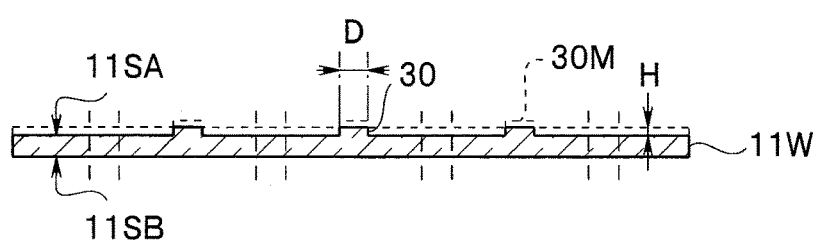
FIG. 7 is a sectional view for explaining the manufacturing method for the optical unit in the embodiment.

As shown in FIG. 7, the first projection 30, an upper surface of which is a plane, is formed on the first principal surface 11SA by etching the first principal surface 11SA of the first wafer 11W using, for example, a hydrofluoric acid solution. The etching mask 30M is peeled after the etching.

Height (an optical axis direction dimension) H of the first projection 30 is, for example, 1 µm or more and 50 µm or less. If the height H is 1 µm or more, a light blocking property of an aperture made of black resin is guaranteed. If the height H is 50 µm or less as explained below, it is easy to inject the black resin. Note that a diameter (an optical axis orthogonal direction dimension) D of the first projection 30 is an opening diameter of the aperture.

Since the first projection 30 is a column, a cross section orthogonal to an optical axis O of the first wafer 11W of the first projection 30 is circular. In other words, an opening of the aperture 50A is circular. Note that the first projection 30 may be a polygonal prism such as a hexagonal prism. A wafer attached with the first projection 30 may be manufactured by bonding a plurality of projections, which are members separate from the first wafer 11W, to the first principal surface 11SA.

Like the first wafer 11W, a fourth wafer 14W including the second projection 31 is manufactured.

<Step S20> Wafer Bonding Step

Figure 8:
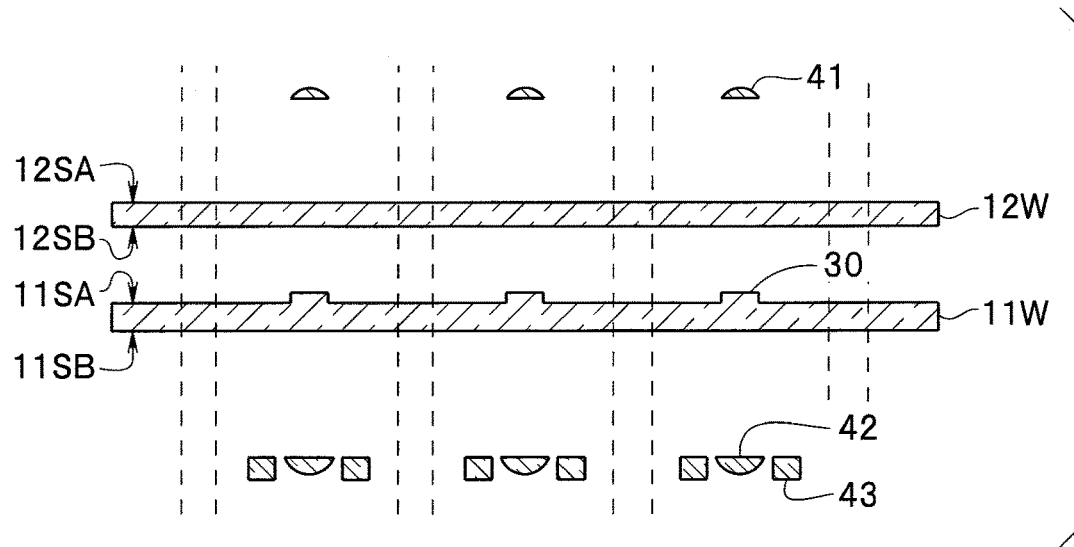
FIG. 8 is a sectional view for explaining the manufacturing method for the optical unit in the embodiment.

As shown in FIG. 8, a second wafer 12W is a glass wafer including the third principal surface 12SA and the fourth principal surface 12SB. The fourth principal surface 12SB of the second wafer 12W and upper surfaces of a plurality of first projections 30 of the first wafer 11W are bonded, whereby the aperture space S50A having height of the first projections 30 is formed.

Ultraviolet curing resin may be used for bonding two wafers for forming a space (the aperture space S50A) in which the black resin is filled. Since a light blocking film for preventing laser irradiation is not disposed on the bonded wafer 1W, curing treatment is easy and high in reliability.

However, if an adhesive spreads to a periphery of a bonding interface, it is likely that an opening shape of an aperture greatly changes. Accordingly, for bonding for forming an aperture space, it is preferable to use a bonding method for not disposing other members on the bonding interface, for example, welding or direct bonding by cleaning and clamping the bonding interface.

Subsequently, the resin lens 42 and the spacer 43 are disposed on the second principal surface 11SB of the first wafer 11W and the resin lens 41 is disposed on the third principal surface 12SA of the second wafer 12W.

In disposing the resin lens 42 and the like, for example, after transparent resin is applied, the resin is cured by irradiating an ultraviolet ray in a state in which a die having a predetermined shape is pressed against the transparent resin.

After a plurality of second projections 31 are formed on the fourth wafer 14W using the same method as the method of forming the first wafer 11W, a third wafer 13W and the fourth wafer 14W are bonded. The resin lens 44 is disposed on a fifth wafer 15W using the same method as the method of forming the first wafer 11W.

Figure 9:
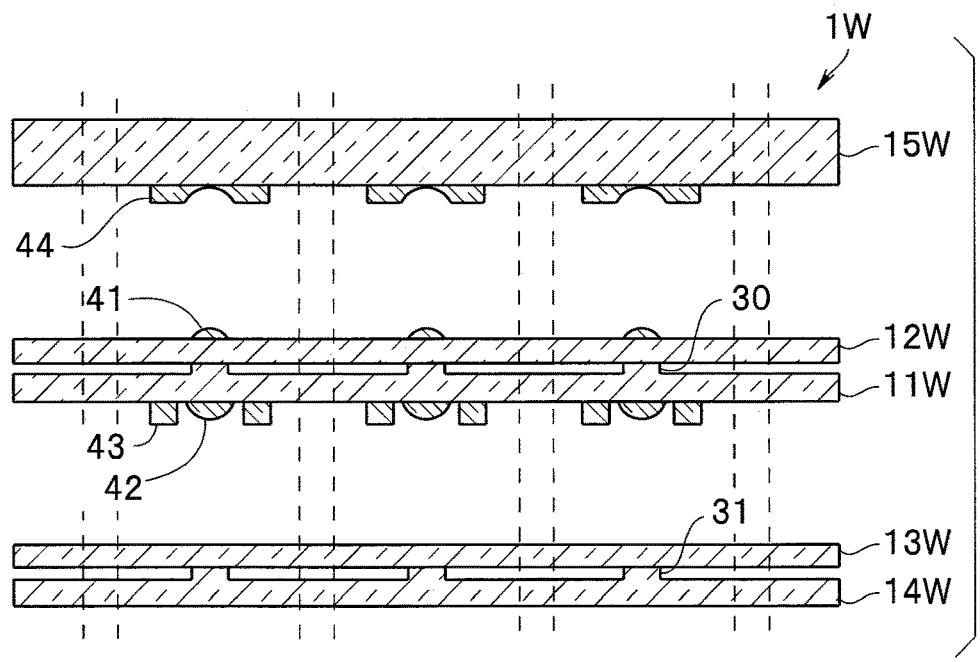
FIG. 9 is a sectional view for explaining the manufacturing method for the optical unit in the embodiment.
Figure 10:
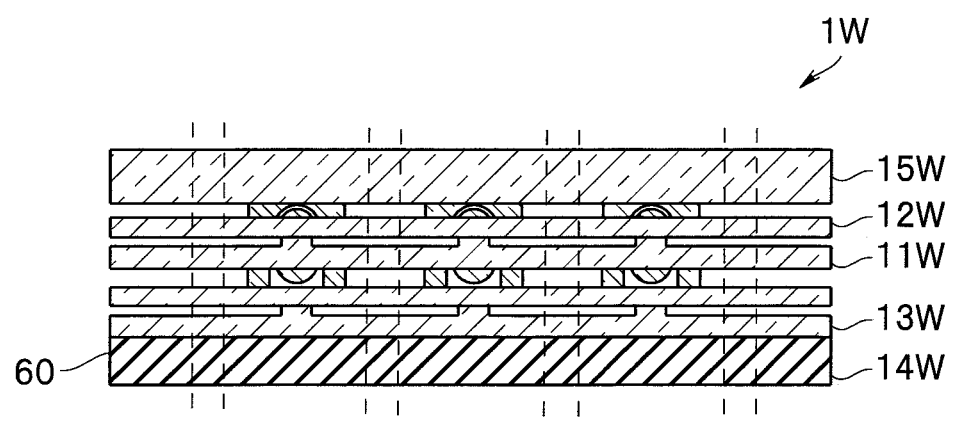
FIG. 10 is a sectional view for explaining the manufacturing method for the optical unit in the embodiment.

As shown in FIG. 9 and FIG. 10, the fifth wafer 15W, a bonded wafer of the first wafer 11W and the second wafer 12W, and a bonded wafer of the third wafer 13W and the fourth wafer 14W are bonded and the bonded wafer 1W is manufactured.

As explained above, a process for manufacturing the bonded wafer 1W includes a first bonding process for forming the two aperture spaces S50A and S50B and a second bonding process for bonding a bonded wafer including the two aperture spaces S50A and S50B to another optical wafer.

Note that an atmosphere of the second bonding process is preferably a decompressed or inert gas. Reliability is improved if a sealing space on an inside of the manufactured optical unit 1 has low pressure smaller than one atm or an inert gas such as nitrogen is filled in the sealing space.

In the second bonding process, it is preferable to use an ultraviolet curing adhesive. This is because the adhesive less easily intrudes into an optical path even if the adhesive extrudes from the bonding interface. In the bonded wafer 1W, since a light blocking film, which hinders ultraviolet ray irradiation, for forming an aperture is not provided, curing treatment is easy and it is unlikely that bonding reliability is deteriorated.

<Step 30> Dividing Step

Figure 11:
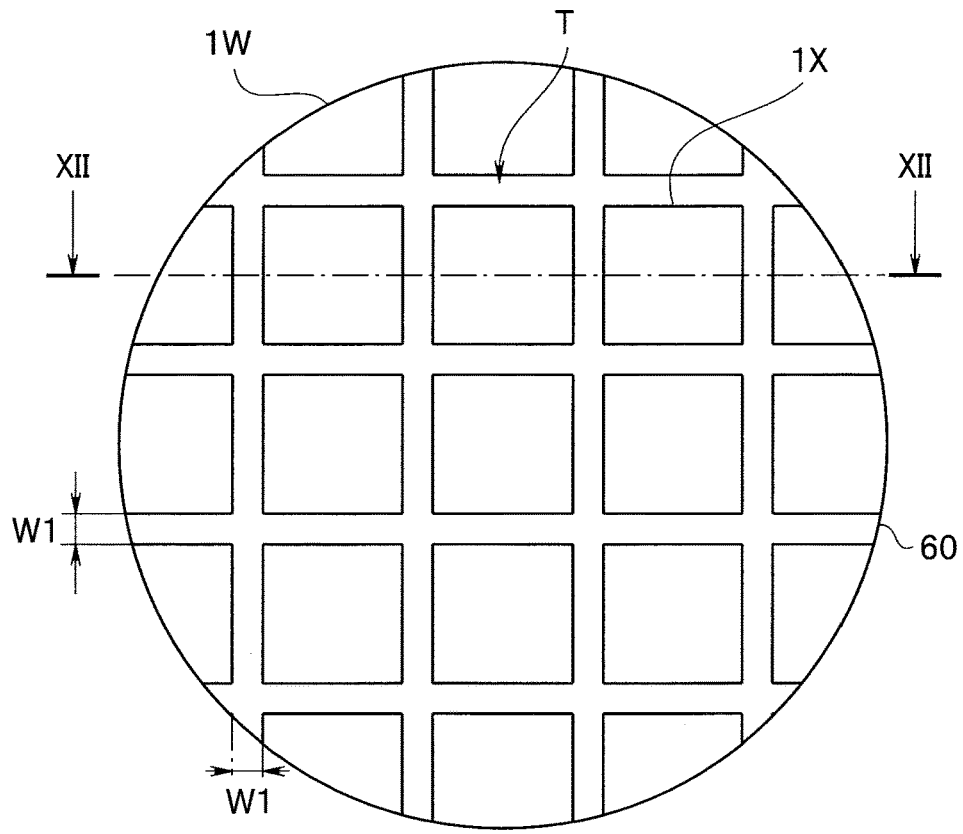
FIG. 11 is a plan view for explaining the manufacturing method for the optical unit in the embodiment.
Figure 12:
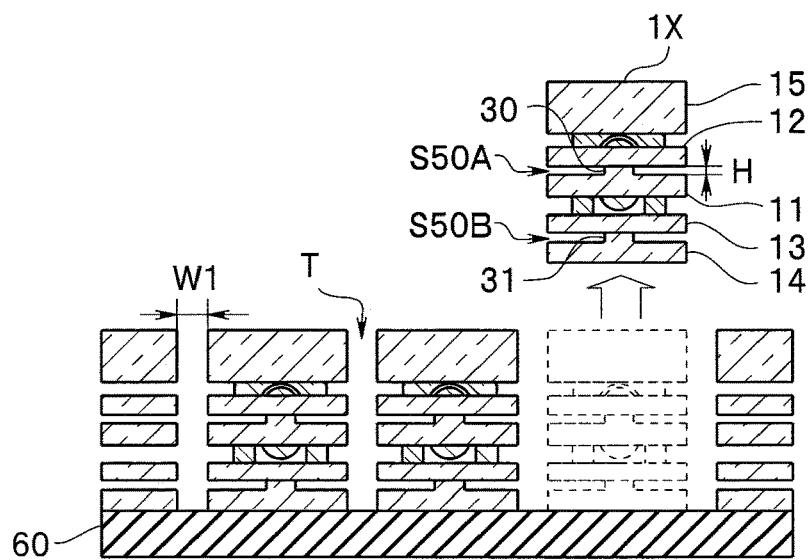
FIG. 12 is a sectional view taken along a XII-XII line in FIG. 11.

As shown in FIG. 11 and FIG. 12, the fourth wafer 14W of the bonded wafer 1W is fixed to a holding wafer 60 using, for example, an adhesive dicing tape (not shown). A groove having width W1 is formed on the bonded wafer 1W, whereby the bonded wafer 1W is divided into a plurality of units 1X. Dicing using a blade or a laser is used for the division. For example, when adhesion of the dicing tape is lost by UV irradiation, the plurality of units 1X fixed to the holding wafer 60 are separated from the holding wafer 60 to thereby be divided.

<Step S40> Black Resin Filling Step

The black resin 50 is filled in each of the aperture space S50A around the first projection 30 and the aperture space S50B around the second projection 31 from side surfaces of the divided units 1X. The optical unit 1 including the first aperture 50A and the second aperture 50B shown in FIG. 2 is manufactured. For example, thermosetting liquid resin in which carbon black particles are dispersed is filled in the groove and the aperture spaces S50A and S50B and the curing treatment is performed.

It is preferable to use a capillary phenomenon to fill the black resin 50. For example, when the height H of the first projection 30, that is, an interval between the first principal surface 11SA and the fourth principal surface 12SB is 50 µm or less, the black resin 50 can be easily filled by interfacial tension without a gap. Note that if the height H of the first projection 30 is, for example, 1 µm or more, a function of an aperture is not spoiled. It is more preferable to fill the black resin 50 in a vacuum state in order to fill the black resin 50 without a gap.

Note that it is preferable to coat the black resin 50 on the side surface of the unit 1X as well when filling the black resin 50 in the aperture spaces S50A and S50B because external light can be prevented from entering an optical path as in the optical unit 1 shown in FIG. 2. A light blocking property is guaranteed, for example, if the thickness of the black resin 50 on the side surfaces is 1 µm or more.

The optical unit 1 is the rectangular parallelepiped but may be divided into, for example, a hexagonal prism according to disposition of a cutting line of the bonded wafer. The shape of the optical unit 1 may be formed as a column by machining after dividing. Further, a rectangular parallelepiped unit 1X may be formed as the columnar optical unit 1 according to disposition of the black resin 50. In other words, the shape of the optical unit 1 is not limited to the rectangular parallelepiped.

In the manufacturing method for the optical unit 1, the black resin 50, which is the light blocking material, is not disposed when machining using light (for example, resin curing by ultraviolet ray irradiation) is performed. Accordingly, the optical unit 1 is easily manufactured and reliability of a bonded section made of curing resin is high.

The image sensor 8 that receives an object image condensed by the optical unit 1 is disposed in the optical unit 1 and an image pickup apparatus is manufactured. After a glass wafer that protects a light receiving section is bonded to an image pickup device wafer in which a plurality of light receiving sections or the like are formed on a silicon wafer by a publicly-known semiconductor manufacturing technique, the image sensor 8 is manufactured by cutting the glass wafer.

<Modifications>

Optical units 1A to 1G in modifications 1 to 7 are similar to the optical unit 1 and have the same effects as the effects of the optical unit 1. Accordingly, components having the same functions as the functions in the optical unit 1 are denoted by the same reference numerals and signs and explanation of the components is omitted.

<Modifications 1 and 2>

A manufacturing method for an optical unit 1A in the modification 1 is different from the manufacturing method for the optical unit 1. As shown in FIG. 12, in the bonded wafer 1W on which a groove T is formed in step S30, the plurality of units 1X are separated but are fixed to the holding wafer 60.

Figure 13:
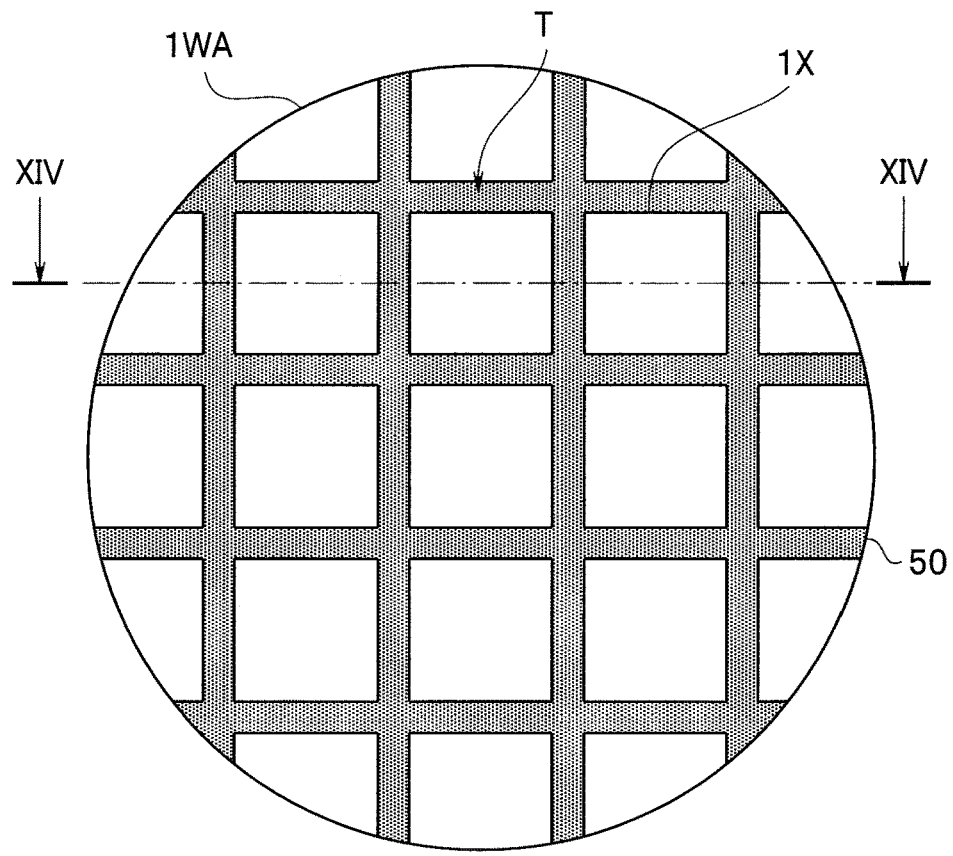
FIG. 13 is a plan view for explaining a manufacturing method for an optical unit in a modification 1.
Figure 14:
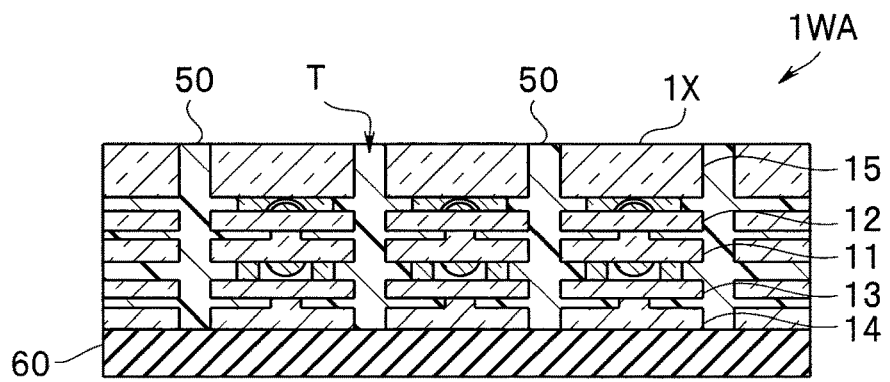
FIG. 14 is a sectional view taken along a XIV-XIV line in FIG. 13.

As shown in FIG. 13 and FIG. 14, in the manufacturing method for the optical unit 1A in the modification 1, the black resin 50 is filled in the groove T of the bonded wafer 1W in a state in which the divided plurality of units 1X are fixed to the holding wafer 60.

In other words, the black resin 50 is filled around the first projection 30, around the second projection 31, and on the side surface of the unit 1X. The divided plurality of units 1X are integrated by the black resin 50 to be a bonded wafer 1WA.

Figure 15:
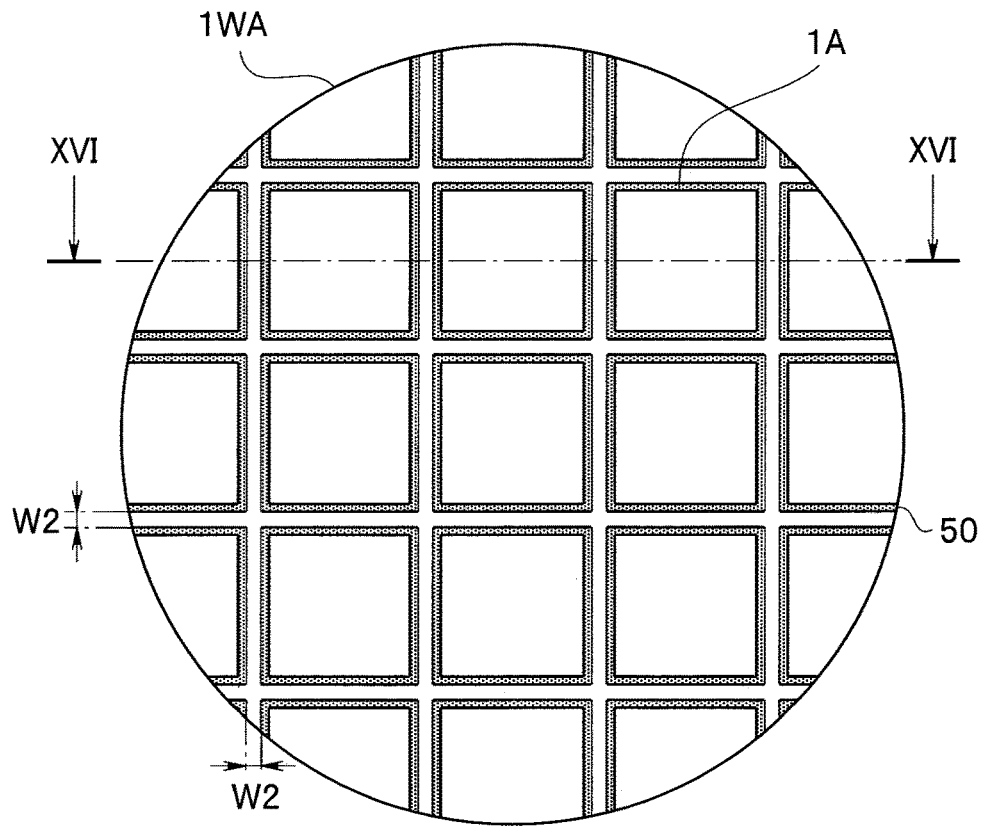
FIG. 15 is a plan view for explaining the manufacturing method for the optical unit in the modification 1.
Figure 16:
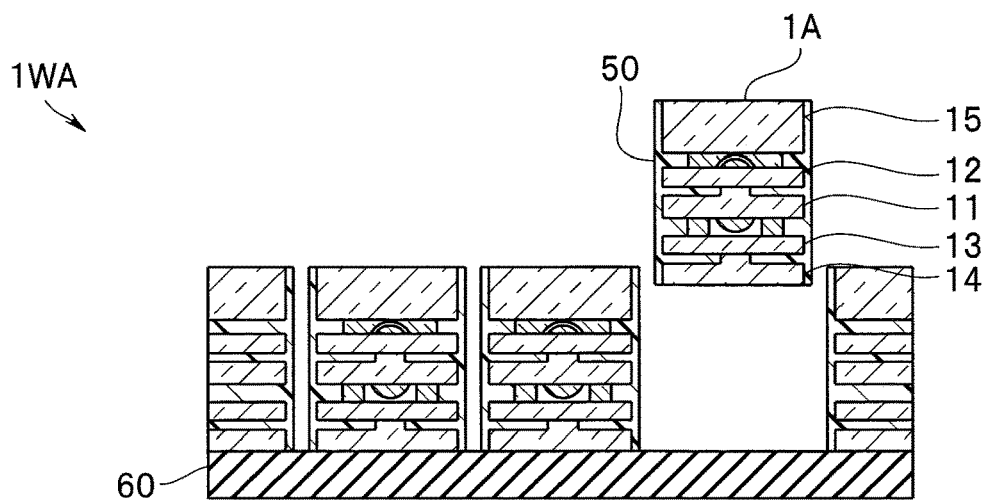
FIG. 16 is a sectional view taken along a XVI-XVI line in FIG. 15.

As shown in FIG. 15 and FIG. 16, the bonded wafer 1WA, in which the black resin 50 is filled in the groove T, is cut at a cutting margin W2 smaller than the width W1 of the groove T to thereby be divided into a plurality of optical units 1A. For example, when the adhesion of the dicing tape is lost by UV irradiation, the optical unit 1A is separated from the holding wafer 60.

With the manufacturing method in the present modification, it is easy to manufacture the plurality of optical units 1A, side surfaces of which are covered by the black resin 50.

After an image pickup device wafer including a plurality of image sensors 8 is bonded to the bonded wafer 1WA, the image sensor 8 in which the optical unit 1A is disposed may be manufactured by dividing the bonded wafer 1WA. The bonded wafer 1WA may be divided after the plurality of image sensors 8 are bonded to the bonded wafer 1WA.

Figure 17:
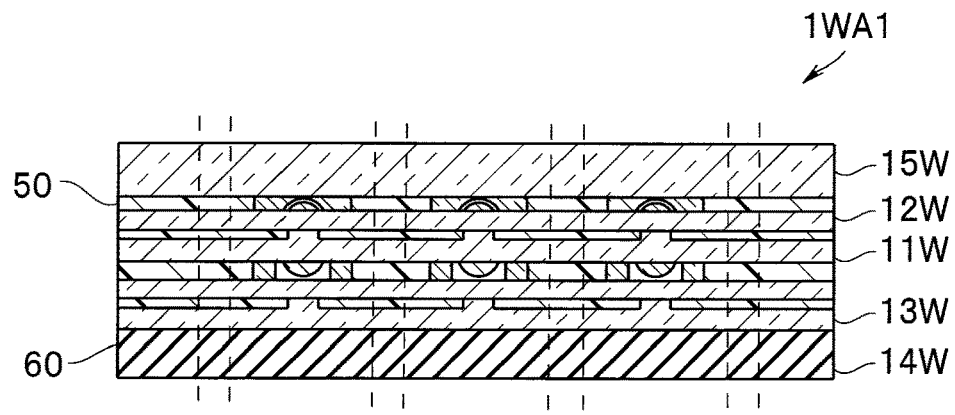
FIG. 17 is a sectional view for explaining a manufacturing method for an optical unit in a modification 2.
Figure 18:
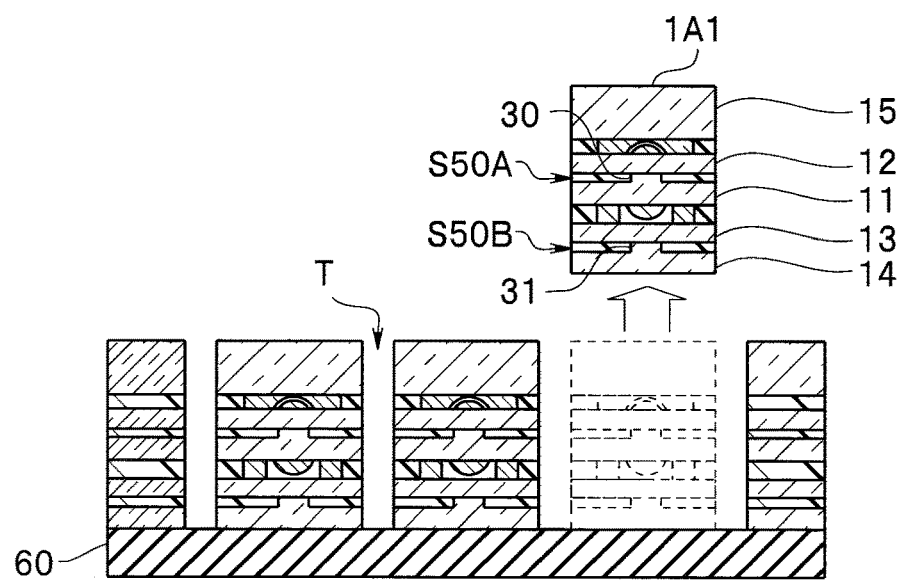
FIG. 18 is a sectional view for explaining the manufacturing method for the optical unit in the modification 2.

In a manufacturing method for an optical unit 1A1 in the modification 2, as shown in FIG. 17, the black resin 50 is filled in the aperture spaces S50A and S50B in a state of the bonded wafer 1W (see FIG. 10) before groove formation. By forming the groove T on a bonded wafer 1WA1 in which the black resin 50 is filled as shown in FIG. 18, the optical unit 1A1 in which the black resin 50 is filled in the aperture spaces S50A and S50B is manufactured.

The black resin 50 is not easily filled if wastes produced when the groove T is formed remain in the aperture spaces S50A and S50B. In the manufacturing method for the optical unit 1A1, since the groove T is formed after the black resin 50 is filled, it is easier to manufacture the optical unit 1A1 than the optical unit 1 and the like.

Note that it is preferable to further coat the black resin 50 on a side surface of the divided optical unit 1A1 as in the optical unit 1.

<Modification 3>

Figure 19:
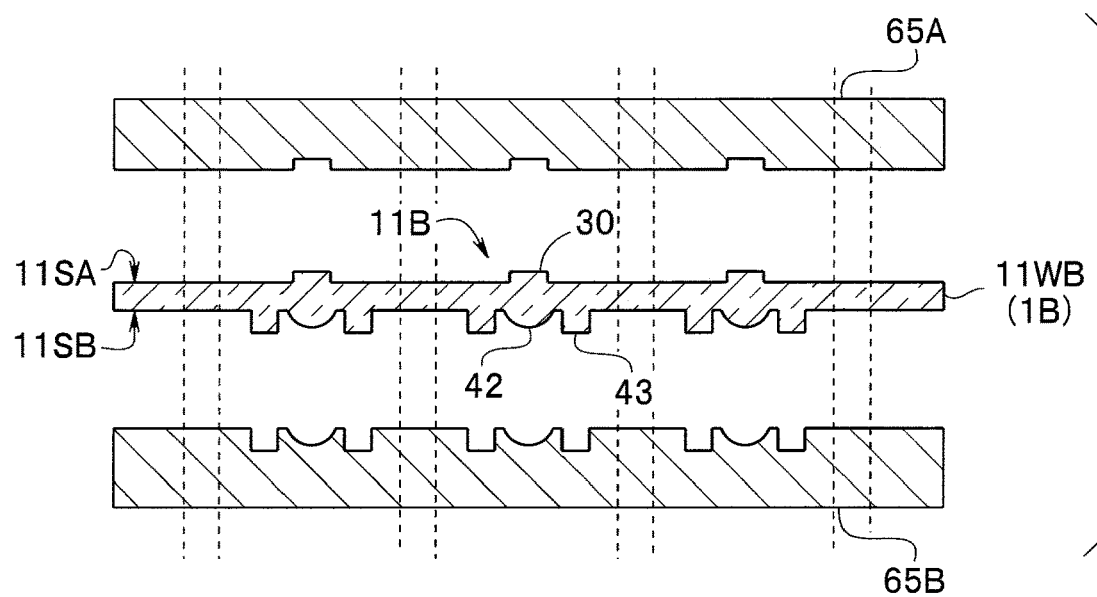
FIG. 19 is a sectional view for explaining a manufacturing method for a first wafer of an optical unit in a modification 3.

In an optical unit 1B in the modification 3, a first substrate 11B is a molded resin substrate including the first projection 30. In other words, as shown in FIG. 19, a first wafer 11WB is made of transparent hard resin. For example, the first wafer 11WB including a plurality of first substrates 11B, on each of which the first projection 30, the resin lens 42, and the spacer 43 are formed, is manufactured by molding a resin plate with a press molding method using dies 65A and 65B. The transparent hard resin is, for example, polycarbonate. The first wafer 11WB can also be manufactured by an injection molding method.

Note that at least any one of other substrates of the optical unit 1B may also be a molded or injection-molded resin optical substrate including the first projection 30 like the first substrate 11B.

<Modification 4>

Figure 20:
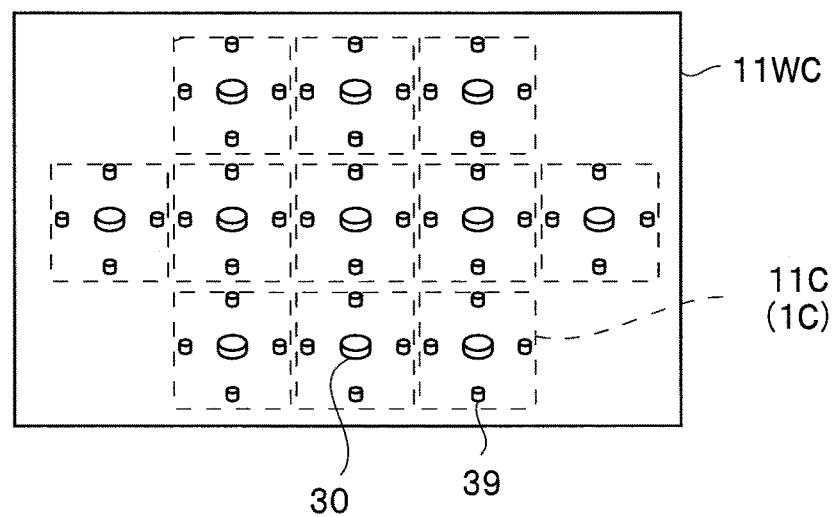
FIG. 20 is a perspective view for explaining a first wafer of an optical unit in a modification 4.

As shown in FIG. 20, in an optical unit IC in the modification 4, a first wafer 11WC includes a plurality of poles 39 having the same height as the height H of the first projection 30 around the first projection 30.

As explained above, an outer diameter D of the first projection 30 is an opening diameter of the aperture 50A. A sectional area in an optical axis orthogonal direction of the first projection 30 (an opening area of the aperture 50A) is as small as 30% or less of an area of the first principal surface 11SA of a first substrate 11C.

Since the first substrate 11C including the plurality of poles 39 is reinforced in bonding to a second wafer, the optical unit IC is more excellent in mechanical strength than the optical unit 1.

Note that the plurality of poles 39 are transparent because the plurality of poles 39 are simultaneously disposed on the first wafer 11WC using the same method as the method of disposing the first projection 30. In an optical unit including two apertures 50A and 50B, a plurality of poles 39 in the aperture 50A and a plurality of poles 39 in the aperture 50B are preferably disposed not to be located on a straight line parallel to the optical axis O. This is to prevent light guide through the transparent poles 39.

<Modification 5>

Figure 21:
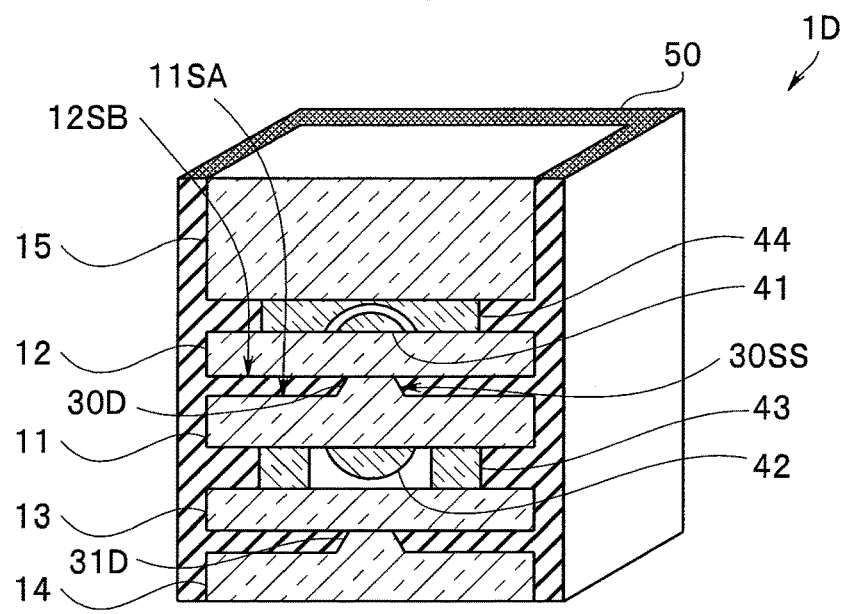
FIG. 21 is a perspective sectional view of an optical unit in a modification 5.

In an optical unit 1D in the modification 5 shown in FIG. 21, for example, a side surface 30SS of a first projection 30D is an inclined surface. A bonding area (an upper part area) of the first projection 30D to the fourth principal surface 12SB is smaller than an area (a lower part area) on the first principal surface 11SA.

To form the side surface 30SS of the first projection 30D as the inclined surface, for example, an isotropic etching method using a hydrofluoric acid solution or a sulfur hexafluoride gas is used in an etching process for forming the first projection 30D.

In the optical unit 1D, flare and ghost likely to be caused by side surface reflection on the first projection 30D are reduced. Note that a slope of at least one of the first projection 30D or a second projection 31D may be an inclined surface.

<Modification 6>

Figure 22:
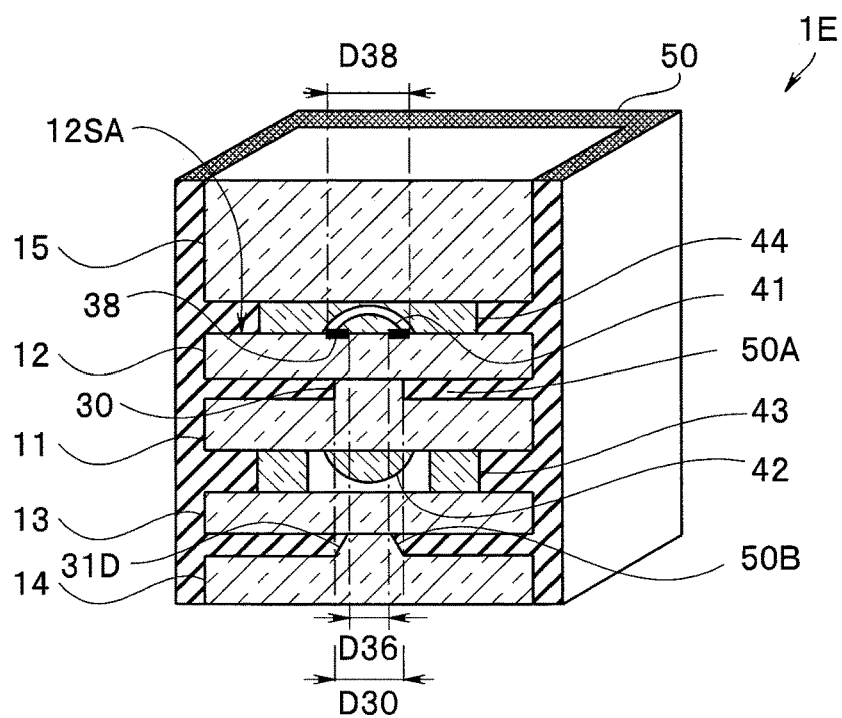
FIG. 22 is a perspective sectional view of an optical unit in a modification 6.

In an optical unit IE in the modification 6 shown in FIG. 22, a film aperture 38 made of a ring-like metal film having an opening diameter (an inner diameter) D36 smaller than an opening diameter D30 of the aperture 50A is included in the third principal surface 12SA. An outer diameter D38 of the film aperture 38 is slightly larger than the opening diameter D30 (for example, 5 μm to 50 μm).

The film aperture 38 is easily formed in an accurate opening shape. In the optical unit IE, the opening shape is defined by the film aperture 38. Light around the film aperture 38 is blocked by the aperture 50A.

The film aperture 38 having the small outer diameter is not an obstacle to, for example, bonding of a wafer by ultraviolet curing resin. A film aperture may also be disposed in the aperture 50B.

<Modification 7>

Figure 23:
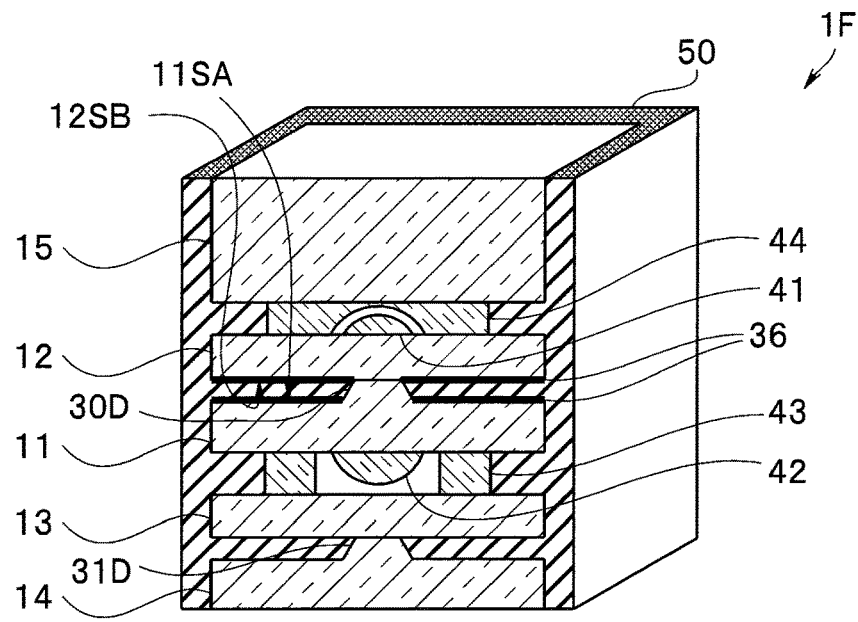
FIG. 23 is a perspective sectional view of an optical unit in a modification 7.

In an optical unit IF in the modification 7 shown in FIG. 23, a reflection prevention surface that prevents reflection of light is disposed in a region located further on an outer side than an optical path of at least one of the first principal surface 11SA or the fourth principal surface 12SB.

For example, reflection prevention films 36 are disposed in regions (outer peripheral regions) located further on outer sides than optical paths of the first principal surface 11SA and the fourth principal surface 12SB. A multilayer film that cancels reflection using interference of light is used as the reflection prevention films 36. The first principal surface 11SA and the fourth principal surface 12SB may be reflection prevention surfaces having fine unevenness.

In the optical unit IF, flare and ghost caused by light reflection are reduced.

Note that at least one of the outer peripheral regions of the optical paths of the second principal surface 11SB and the third principal surface 12SA is also preferably the reflection prevention surface. Further, at least one of the side surface of the first projection 30D or the side surface of the second projection 31D is also more preferably the reflection prevention surface.

<Modification 8>

Figure 24:
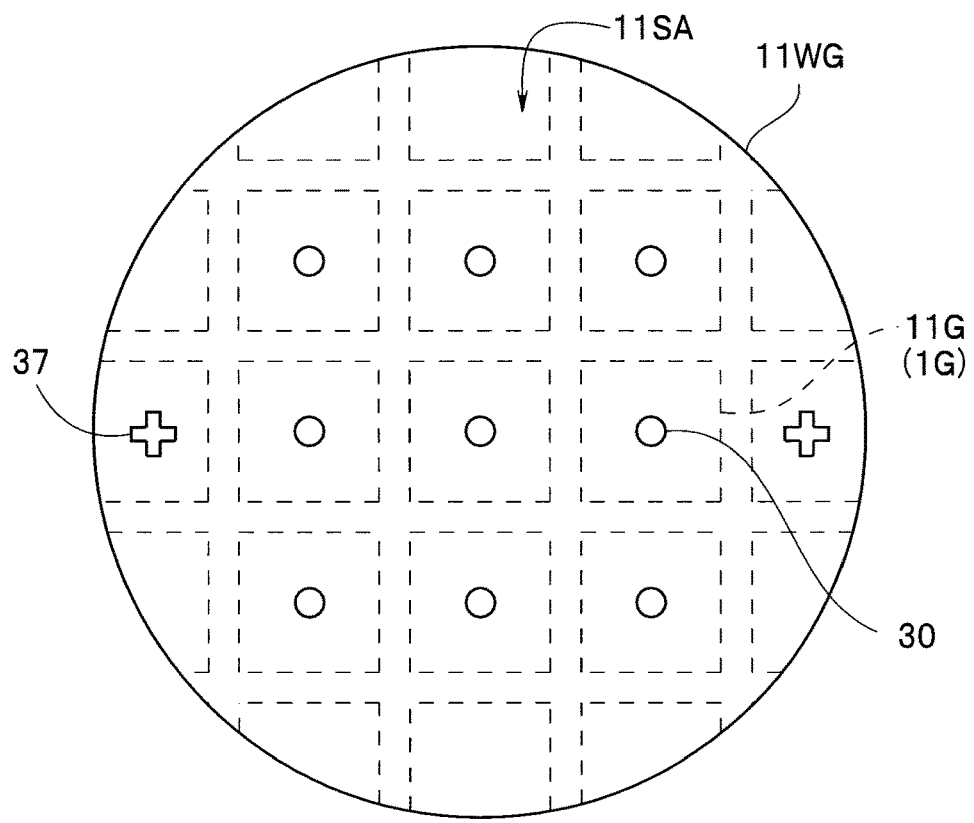
FIG. 24 is a plan view for explaining a first wafer of an optical unit in a modification 8.

An alignment mark 37 simultaneously formed when the first projection 30 is disposed is disposed around regions to be a plurality of first substrates 11 of a first wafer 11WG for manufacturing an optical unit 1G in the modification 8 shown in FIG. 24. Although not shown, an alignment mark corresponding to the alignment mark 37 is disposed on a second wafer as well.

A plurality of wafers on which alignment marks 37 are disposed are easily positioned when being stacked. Note that the alignment marks 37 may be respectively disposed in the regions to be the first substrates 11.

Note that it goes without saying that endoscopes 9A to 9G (see FIG. 1) including the optical units 1A to 1G have the effects of the endoscope 9 including the optical unit 1 and further have the effects of each of the optical units 1A to 1G.

The optical units 1 and 1A to 1G for endoscope are explained above. However, uses of the optical units 1 and 1A to 1G are not limited to the endoscope.

The present invention is not limited to the embodiment and the like explained above. Various changes, alterations, and the like can be made in a range in which the gist of the present invention is not changed.

What is claimed is:

1. An optical unit comprising:
   a transparent first substrate including a first principal surface and a second principal surface on an opposite side of the first principal surface;
   a transparent second substrate including a third principal surface and a fourth principal surface on an opposite side of the third principal surface;
   a transparent first projection that defines an interval between the first principal surface and the fourth principal surface and forms a part of an optical path; and
   a first aperture configured by black resin filled in a space between the first principal surface and the fourth principal surface around the first projection;
   wherein an area of a cross section orthogonal to an optical axis of the first projection is 30% or less of an area of the cross section of the first substrate, and
   the optical unit comprises a plurality of poles having a same height as a height of the first projection between the first principal surface and the fourth principal surface around the first projection.

2. The optical unit according to claim 1, wherein a lens is disposed on at least one of the second principal surface or the third principal surface.

3. The optical unit according to claim 2, wherein the lens is made of resin.

4. The optical unit according to claim 1, wherein
   the first substrate, the second substrate, and the first projection are made of glass, and
   the first projection is a part of the first substrate.

5. The optical unit according to claim 1, wherein the first substrate is a resin substrate including the first projection made of resin.

6. The optical unit according to claim 1, wherein a side surface is covered with the black resin.

7. The optical unit according to claim 1, wherein a side surface of the first projection is an inclined surface projecting toward the fourth principal surface.

8. The optical unit according to claim 1, wherein at least one of the first principal surface or the fourth principal surface is a reflection prevention surface.

9. An optical unit comprising:
- a transparent first substrate including a first principal surface and a second principal surface on an opposite side of the first principal surface;
- a transparent second substrate including a third principal surface and a fourth principal surface on an opposite side of the third principal surface;
- a transparent first projection that defines an interval between the first principal surface and the fourth principal surface and forms a part of an optical path; and
- a first aperture configured by black resin filled in a space between the first principal surface and the fourth principal surface around the first projection;
- wherein the optical unit includes, in the third principal surface, a film aperture made of a metal film having an opening smaller than the aperture.

10. The optical unit according to claim 1, wherein other members are not disposed on a bonding interface between the first projection and the first substrate and a bonding interface between the first projection and the second substrate.

11. An optical unit comprising:
- a transparent first substrate including a first principal surface and a second principal surface on an opposite side of the first principal surface;
- a transparent second substrate including a third principal surface and a fourth principal surface on an opposite side of the third principal surface;
- a transparent first projection that defines an interval between the first principal surface and the fourth principal surface and forms a part of an optical path; and
- a first aperture configured by black resin filled in a space between the first principal surface and the fourth principal surface around the first projection; and
- a second aperture configured by black resin filled in a periphery of a second projection sandwiched by a transparent third substrate and a transparent fourth substrate, wherein
- the first aperture disposed in a position closer to an object than the second aperture is a brightness aperture, and the second aperture is a flare aperture.

* * * * *